Dec. 14, 1965    SEIICHI SAKAKIBARA ETAL    3,222,714
APPARATUS FOR SMOOTHING POLYVINYL ALCOHOL FILM DURING
CONDITIONING OF SAID FILM IN A CONTROLLED
ATMOSPHERE CHAMBER
Filed Oct. 11, 1962

INVENTORS
SEIICHI SAKAKIBARA
TAKUYA ONO
BY Louis F. Kreek, Jr.

United States Patent Office 3,222,714
Patented Dec. 14, 1965

3,222,714
APPARATUS FOR SMOOTHING POLYVINYL ALCOHOL FILM DURING CONDITIONING OF SAID FILM IN A CONTROLLED ATMOSPHERE CHAMBER
Seiichi Sakakibara and Takuya Ono, Kurashiki-shi, Japan, assignors to Kurashiki Rayon Co., Ltd., Kurashiki-shi, Japan, a corporation of Japan
Filed Oct. 11, 1962, Ser. No. 229,842
Claims priority, application Japan, Oct. 14, 1961, 36/37,413
1 Claim. (Cl. 18—1)

This application relates to apparatus for use in the manufacture of films and more particularly to apparatus for removing wrinkles and generally smoothing thermoplastic films such as films of polyvinyl alcohol. Films of this general type are manufactured by casting or extrusion, both well-known conventional film forming methods. Such film is conventionally treated by passing it through a controlled atmosphere chamber which typically may be a high humidity chamber. Since the physical properties and dimensions of the film are altered in a desired manner in the course of the passage through the controlled atmosphere chamber, it is known to pass the film over a number of rollers that may be operated at different peripheral speeds to thereby avoid the occurrence of excessive tension or slack in the film in its passage between successive rolls. It has been found however, that the foregoing processing does not result in a smooth or wrinkle-free product particularly in the processing of polyvinyl alcohol film.

It is therefore the object of the present invention to provide apparatus for the treatment of film that will assure the production of a smooth and wrinkle-free product.

In accordance with the present invention, film produced by conventional means is passed through a controlled atmosphere chamber. In this chamber the film passes over a plurality of driven rolls which are so constructed and arranged that the peripheral speed of each may be independently controlled. Between successive driven rolls the film is caused to pass over a plurality of idler rolls the composition and number of which can be varied to suit the local condition of the film as it proceeds through the controlled humidity chamber. In order to provide more than mere tangential contact of the film with the idler rolls, the rolls are arranged on a frame that gives the group of rolls a generally convex form thus causing the film to be stretched over each idler roll with a substantial contact area. The invention will be more fully understood by reference to the following description and the accompanying drawings in which:

Figure 1:
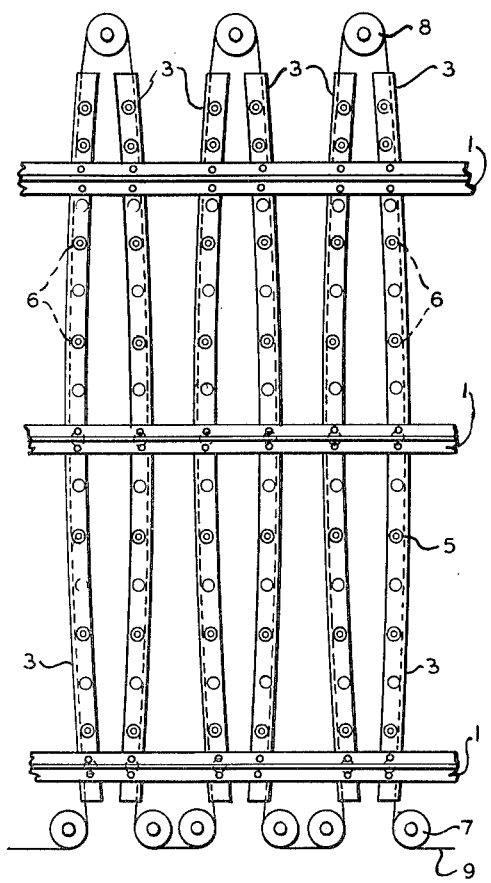
FIGURE 1 is a partially broken away side view of a series of rollers and their supports in accordance with the present invention.
Figure 2:
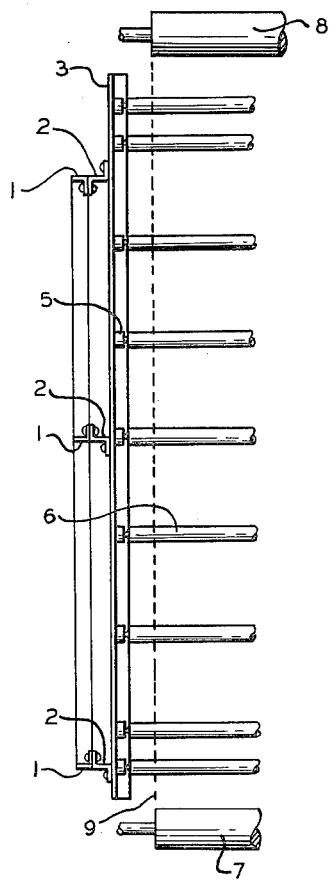
FIGURE 2 is an end view broken away of one side of the apparatus of FIGURE 1.
Figure 3:
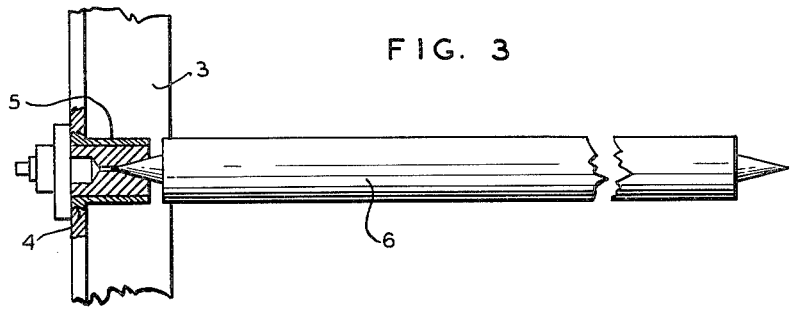
FIGURE 3 is a detailed drawing on an enlarged scale of one of the idler rolls of FIGURES 1 and 2 and its support.

Structural members 1, which may be joined together into a machine frame, support, through the medium of suitable connecting members 2, elongated bow shaped roller supports 3. These bow shaped roller supports 3 are arranged back to back in pairs so that the space between them is greater at their centers than at their ends, forming a generally convex outer surface. A number of such pairs of roller supports 3 may be provided to cooperate with a corresponding number of sets of driven rolls 7 and 8 which are arranged in the conventional manner for zig-zag passage of film thereover. Pairs of roller supports 3 are provided at each end of the driven rolls 7 and 8. Each of the roll supports 3 contains a plurality of means for supporting idler rolls 6. While this invention is not limited to the manner in which the idler rolls are supported, one suitable method of support is to insert a pivot bearing sub-assembly 5 into holes 4 in the flange of the roller support 3. The pivot bearing sub-assembly can typically be secured to the flange of support 3 by threading it into hole 4 which may be tapped. It may be seen that this construction makes it convenient to move, remove or replace idler rolls 6 by simply removing the pivot bearing sub-assembly 5 from one end of the idler roll 6. Since it is desired that the idler roll 6 be free to turn with a minimum of frictional drag, it is preferred that the bearing be a needle bearing as shown in FIGURE 3 or a ball or roller bearing of some suitable design. As previously stated herein, the entire assembly of supports, driven rollers and idler rollers shown in the accompanying figures are housed within a controlled atmosphere chamber through which the film is passed.

It may be seen that the film designated in the figures by the reference numeral 9 will now be caused to travel in a zig-zag fashion through the controlled humidity chamber over the series of driven rolls 7 and 8. Between each such driven roll 7 and the adjacent roll 8 the film is drawn over a plurality of idler rolls 6 that are arranged in an approximately arcuate path in accordance with the shape of the roll supports 3. The film is drawn over these idler rolls under tension determined by the speed of rotation of the driven rolls 7 and 8 and the number and spacing of the idler rolls 6. In the course of this treatment wrinkles are removed from the film so that it emerges from the controlled atmosphere chamber as a uniformly smooth product. Since the physical characteristics of the film change as it passes through the controlled atmosphere chamber, it is necessary to apply varying amounts of tension to the film at various points in its passage depending on the condition of the film at the particular time in question. The above described novel apparatus provides for regulating the tension applied to the film at any point in its passage through the apparatus by regulating the speed of the driven rolls 7 and 8 and by shifting or changing the position or number of idler rolls 6. It has been found that the control afforded by the available variations in the number and position of the idler rolls 6 is necessary particularly to smooth the wrinkling that otherwise occurs towards the sides of the film.

While only one embodiment of the invention has been shown and described herein, it is to be understood that the invention is not limited to the particular form shown, but may be used in other ways without departure from its spirit as defined by the following claim.

We claim:
Apparatus for removing wrinkles from polyvinyl alcohol film and for conditioning said film to prepare a uniformly smooth polyvinyl alcohol film product which comprises,
 a controlled atmosphere chamber;
 passage means contained in said chamber whereby polyvinyl alcohol film introduced into said chamber is conducted through said chamber in a continuous zig-zag path and where said zig-zag path comprises a plurality of curvilinear sections having a generally convex form,
 said passage means including a plurality of driven rolls for drawing said polyvinyl alcohol film through said chamber,
 said passage means also including a plurality of idler rolls spaced between successive driven rolls and said idler rolls having parallel axes and being arranged along a support that is generally convex in form whereby said polyvinyl alcohol film is drawn over said idler rolls and firmly engages each idler roll with a finite area of contact and where said idler rolls maintain said film in said plurality of convex sections during the passage of said film through said chamber, and means associated with said idler roll supports where the number and spacing of said idler rolls can be adjusted to vary the length of the unsupported polyvinyl alcohol film span between successive driven rolls and to vary the contact area of said film on each idler roll, and means for regulating the speed of said driven rolls, said speed regulating means and said means for varying the number and spacing of said idler rolls on said supports allowing said polyvinyl alcohol film to be subjected to varying amounts of desired tension along said film zig-zag path to suit the local conditions of said film as it passes through said chamber whereby wrinkles formed in said film due to changes in physical characteristics of said film are continuously removed and whereby the film emerging from said chamber is a uniformly smooth polyvinyl alcohol film product.

References Cited by the Examiner
UNITED STATES PATENTS

| | | | |
|---|---|---|---|
| 1,432,729 | 10/1922 | Pinder | 34—159 |
| 1,432,736 | 10/1922 | Reed | 34—159 |
| 2,196,917 | 4/1940 | Hartley | 34—159 |
| 3,061,884 | 11/1962 | Hirano et al. | 264—345 |

ALEXANDER H. BRODMERKEL, *Primary Examiner.*